Aug. 8, 1933.　　　　K. A. SIMMON　　　　1,921,588
MOTOR VEHICLE
Filed Oct. 1, 1927　　　2 Sheets-Sheet 2

INVENTOR
Karl A. Simmon
BY
ATTORNEY

Patented Aug. 8, 1933

1,921,588

UNITED STATES PATENT OFFICE 1,921,588

MOTOR VEHICLE

Karl A. Simmon, Edgewood, Pa.

Application October 1, 1927. Serial No. 223,407

4 Claims. (Cl. 180—54)

My invention relates generally to motor vehicles and more particularly to motor vehicles propelled by power units utilizing internal-combustion engines as such power units.

The object of the inventoin, generally stated, is the provision of a motor vehicle that shall be simple and efficient in operation and which shall have its parts disposed in such a manner as to be readily accessible.

A more specific object of the invention is to provide for a quick removal and replacement of the power units in motor vehicles.

Another object of the invention is to provide for concentrating the mechanical equipment at the rear end of the vehicle so that the entire front end is available for the operator and passengers, thus ensuring for them a substantially unobstructed view of the roadway and its surroundings.

It is also an object of the invention to provide a motor vehicle in which all the fumes, gases and heat that may be produced by the apparatus employed in propelling it may readily be dissipated at the rear end, whereby the passengers are relieved from possible annoyances and discomfort.

Other objects of the invention will, in part, be obvious, and will, in part, appear hereinafter.

The invention, as disclosed in the accompanying drawings, comprises the structural features and the combination of elements and arrangement of parts which will be hereinafter set forth and particularly defined in the claims.

Figure 1:
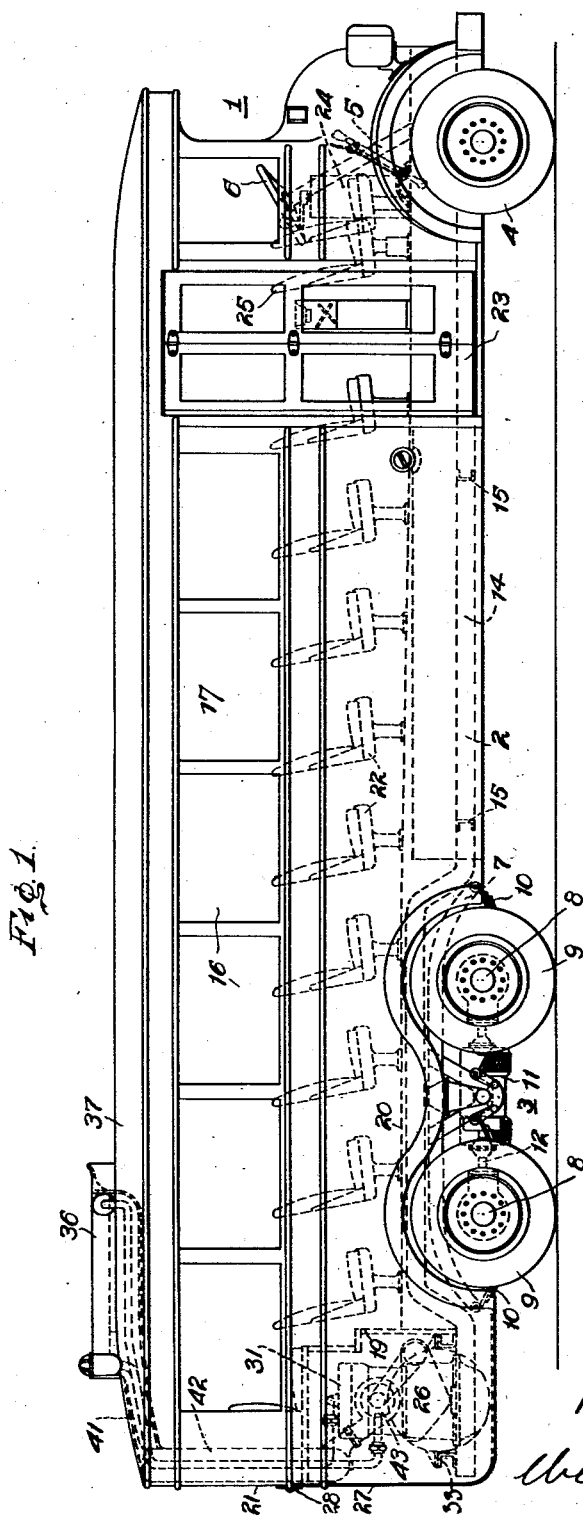
Figure 2:
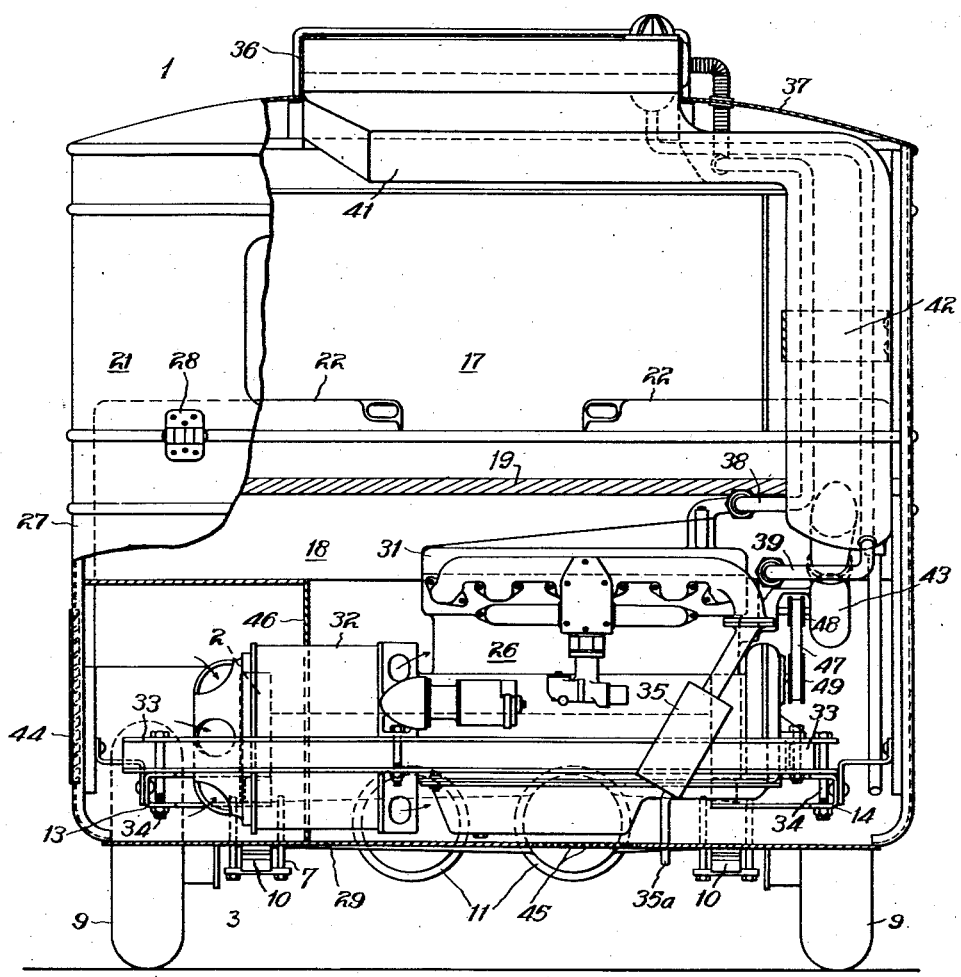

For a fuller understanding of the invention, reference may be had to the following detailed description, taken in connection with the accompanying drawings, in which:

Figure 1 is a view, in side elevation, of a motor vehicle embodying my invention, and Fig. 2 is a view, in rear elevation, of the vehicle shown in Fig. 1, a portion of its outer walls being broken away to disclose the arrangement and location of the power plant of the vehicle.

In the drawings, I have illustrated a motor vehicle comprising a body 1 that is mounted upon a frame 2 which is supported upon a rear truck 3 and a pair of front wheels 4.

The front wheels 4, as shown, are of any well-known type employed on motor vehicles and are connected with a steering post 5 and a wheel 6 by means of which the vehicle may be guided.

The rear truck 3 is of the self-contained type and comprises a truck frame 7 which is mounted upon a pair of axles 8 and wheels 9 by means of a plurality of springs 10. It is secured in its position under the rear portion of the vehicle body by means of a bolster or cradle (not shown).

The vehicle is driven through the rear truck 3, the driving means comprising a pair of electric motors 11 that are mounted in longitudinal positions, preferably, in the center portion of the truck, and may be connected to the truck wheels 9 through the axles 8 and the propeller shafts 12 or by a train of gears.

The main frame 2 for supporting the body upon the rear truck 3 and the front wheels 4 comprises a pair of channel-shape members 13 and 14 that extend longitudinally of the vehicle and a number of cross-connecting members 15. The main frame may be constructed in the usual well-known manner, with the exception that the rear portions of the longitudinal members are not conencted together but are left open, for a purpose to be hereinafter described.

As shown, the vehicle body is mounted on the main frame and is provided with a plurality of windows 16 in its end walls and in its side walls. The interior of the body is divided into a main compartment 17 and a small rear compartment 18 by means of a sealed partition 19 which extends from the floor 20 of the vehicle to approximately one-half the height of the body and then rearwardly to the rear wall 21 of the body.

The main compartment is provided with a plurality of seats 22 for passengers, and a door 23 is disposed near its front end for the purpose of providing an entrance. In order that the operator may have an unobstructed view, while driving the vehicle; the controlling mechanism 24, the steering wheel 6 and the seat 25 for the operator are disposed in the front end of the car.

The rear compartment 18 extends laterally of the vehicle body, covering the open rear end of the chassis frame and providing a housing for a power plant 26 for supplying energy to the driving motors 11.

For the purpose of providing an entrance to the rear compartment and ready access to the power plant disposed therein, a portion of the rear wall of the vehicle body is constructed in the form of a door 27, the upper edge of which is secured to the body by means of hinges 28. The lower edge of the door may be secured to the body by well-known door-fastening means (not shown). However, it will be readily understood that the door may be as conveniently placed in the side of the rear compartment. A pan 29 is disposed underneath the rear compartment to keep dust and dirt from the power plant 26.

As illustrated, the power plant 26 for supplying energy to the driving motors 11 comprises an internal-combustion engine 31 and an electric generator 32 coupled thereto. In order that the engine 31 and the generator 32 may be handled as a unit and may be readily and quickly placed in, or removed from, the vehicle for repairs or replacement, they are connected, as a unit, and are supported upon a pair of channel members disposed to form a common base 33 which is mounted transversely upon the open rear ends of the main frame. The base 33 may be secured in position by means of bolts 34 or any other suitable fastening devices. The engine is provided with a muffler 35 for the exhaust gases and a pipe 35a for conducting such gases to the atmosphere through the rear underpart of the car.

Inasmuch as any suitable engine and generator commonly provided for propelling vehicles may be employed in connection with my invention, a detailed description of the engine and generator illustrated will not be given.

The engine shown is of the water-cooled type and is provided with a water-circulating system and a radiator 36. In this embodiment of the invention, the radiator 36 is mounted upon the rear part of the roof 37 of the car body and connected to the engine by water-circulating pipes 38 and 39. However, the same advantages may be obtained to some degree by mounting the radiator on the side of the roof.

An air-circulating system for cooling the power plant and the radiator is also provided by connecting the rear compartment 18 and the radiator shell 41 with a conduit 42 and mounting a fan or blower 43 in the conduit 42 for circulating air therethrough.

In order that air may be drawn into the rear compartment at suitable points, a ventilator 44 is disposed in the side wall of the vehicle body at a point opposite the outer end of the generator 32, and a floor ventilator 45 is located in the pan 29 underneath the rear compartment at a point underneath the engine. A baffle plate 46 is placed around the generator in such position as to cause the air that enters the rear compartment through the side ventilator 44 to pass through the interior of the generator 32 before it flows around the engine 31.

The fan 43 is operated by a belt 47 that passes over a pulley 48 on the fan 43 and a pulley 49 on the engine and is driven in a direction to draw air into the rear compartment and force it out through the conduit 42 and the radiator 36 on the rear end of the roof of the car.

It will thus be seen that the generator 32 and the engine 31 are supplied with separate streams of fresh cool air and that all of the cooling air is carried out to the atmosphere through the radiator 36. When this construction is employed, all the fumes and gases that arise from the power plant are either carried to the rear top part of the vehicle by the current of ventilating air through the radiator 36 or are carried to the rear underpart of the car by the exhaust pipe 35a, where they cannot annoy or distress the passengers in the car.

When it is desired to remove the power plant for repairs or replacement, the rear door 27 is raised, and the pan 29 underneath the power plant is removed. The bolts 34 that fasten the power plant to the main frame are then taken out, and the connections between the engine and the radiator, as well as the electrical connections between the generator and the motors, are loosened. A wheeled jack may then be placed under the power plant to raise it slightly above the main frame and withdraw it rearwardly from the vehicle.

It will thus be seen that I have provided a vehicle in which the power plant is located in the rear part thereof where it is readily accessible for adjustment and removal for repairs or replacement. It will also be noted that, inasmuch as the power plant is located in the rear part of the vehicle and is completely sealed off from the main compartment thereof, any fumes or gases arising therefrom will pass to the rear of the vehicle and away from the passengers and the operator.

While the illustrated example constitutes a particular embodiment of my invention, I do not limit myself strictly to the details shown, since, manifestly, the same may be varied considerably without departing from the spirit of the invention as defined in the appended claims.

I claim as my invention:

1. A motor vehicle comprising a body having a rear compartment, an internal-combustion engine disposed in said compartment, a cooling system for said engine, a radiator for the cooling system mounted upon the roof of said body, a conduit leading from the engine to the radiator, and a fan for circulating air around the engine, through the conduit and out through the radiator.

2. A motor vehicle comprising a body provided with a rear compartment and having an opening in the wall of the compartment for admitting air thereto, an internal-combustion engine disposed in the compartment, a cooling system for the engine, a radiator for the cooling system mounted upon the roof of the body, a conduit leading from the compartment to the radiator, and a fan for drawing air into the compartment around the engine and forcing it out through the conduit and the radiator.

3. A motor vehicle comprising a body provided with a rear compartment, a main frame for supporting said body, a sub-frame removably mounted upon the rear part of the main frame, a generator for supplying power for driving the vehicle and an internal-combustion engine for driving the generator mounted upon the sub-frame in the compartment, a water-cooling system for the engine, a radiator for the cooling system mounted upon the roof of the body, a conduit connecting the compartment and the radiator, a fan for drawing air into the compartment and forcing it out through the radiator, and a baffle plate surrounding the generator for directing some of the circulated air through the generator.

4. A motor vehicle comprising a frame open in the rear, running gear supporting said frame, a motor associated with the running gear for driving the vehicle, a body mounted upon the frame and having a rear compartment, a base detachably mounted upon the open rear end of the frame, a generator and an internal-combustion engine coupled together and mounted upon the base for supplying energy to the motor, a radiator mounted upon the roof of the body, means for circulating a cooling fluid through the radiator and the engine, a conduit for connecting the radiator and the compartment for directing air through the generator, and a fan for drawing air into the compartment and forcing it out through the radiator.

KARL A. SIMMON.